United States Patent
Um et al.

(10) Patent No.: US 12,430,710 B2
(45) Date of Patent: Sep. 30, 2025

(54) APPARATUS AND METHOD FOR 360-DEGREE VIDEO STITCHING

(71) Applicant: ELECTRONICS AND TELECOMMUNICATIONS RESEARCH INSTITUTE, Daejeon (KR)

(72) Inventors: Gi-Mun Um, Daejeon (KR); Seong-Yong Lim, Daejeon (KR); Hee-Kyung Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 587 days.

(21) Appl. No.: 17/573,161

(22) Filed: Jan. 11, 2022

(65) Prior Publication Data
US 2022/0222774 A1    Jul. 14, 2022

(30) Foreign Application Priority Data

Jan. 11, 2021   (KR) .................. 10-2021-0003576
Jan. 18, 2021   (KR) .................. 10-2021-0006924
Jan. 3, 2022    (KR) .................. 10-2022-0000265

(51) Int. Cl.
*G06T 3/4038*    (2024.01)
*G06T 3/12*    (2024.01)
(Continued)

(52) U.S. Cl.
CPC .............. *G06T 3/4038* (2013.01); *G06T 3/12* (2024.01); *G06T 3/14* (2024.01); *G06V 10/46* (2022.01)

(58) Field of Classification Search
CPC .......... G06T 3/4038; G06T 3/12; G06T 3/14; G06V 10/46; G06V 10/16
See application file for complete search history.

(56) References Cited

U.S. PATENT DOCUMENTS 9,286,656 B2    3/2016  Lee et al.
11,205,305 B2   12/2021 Sadi et al.
(Continued)

FOREIGN PATENT DOCUMENTS

KR    10-2014-0081639   7/2014
KR    10-2017-0052674   5/2017
KR    10-2020-0111639   9/2020

OTHER PUBLICATIONS

Ye-Kui Wang et al.; "WD 4 of ISO/IEC 23090-2 OMAF 2nd edition," International Organisation for Standardisation Organisation Internationale de Normalisation; ISO/IEC JTC1/SC29/WG11; Coding of Moving Pictures and Audio; ISO/IEC JTC1/SC29/WG11 N18227-v1, Jan. 2019.

*Primary Examiner* — Nay A Maung
*Assistant Examiner* — Dustin Bilodeau
(74) *Attorney, Agent, or Firm* — KILE PARK REED & HOUTTEMAN PLLC

(57) ABSTRACT

Disclosed herein are an apparatus and method for 360-degree video stitching. The apparatus for 360-degree video stitching includes memory for storing at least one program, and a processor for executing the program, wherein the program is configured to stitch features of multiple input images based on at least one parameter included in a 360-degree stitching function description template, and then creating a single 360-degree video, the 360-degree stitching function description template includes a configuration parameter that is an array of function parameters, the configuration parameter includes a stitching parameter, a camera parameter, a feature parameter, and a projection parameter, the feature parameter includes a method for extracting respective features from multiple input images, and the (Continued)

projection parameter includes a projection type that is a kind of a projection plane onto which the multiple input images are projected.

10 Claims, 4 Drawing Sheets

(51) Int. Cl.
*G06T 3/14* (2024.01)
*G06V 10/46* (2022.01)

(56) References Cited

U.S. PATENT DOCUMENTS

| | | |
|---|---|---|
| 2006/0056722 A1 | 3/2006 | Moroney |
| 2016/0286138 A1 | 9/2016 | Kim |
| 2020/0020077 A1* | 1/2020 | You ...................... H04N 5/2624 |
| 2020/0053393 A1* | 2/2020 | Niamut ................ H04N 19/597 |
| 2020/0302575 A1 | 9/2020 | Lee et al. |
| 2021/0027496 A1* | 1/2021 | Koyama .................... G06T 7/73 |
| 2021/0342972 A1* | 11/2021 | Mironica .............. G06T 3/4038 |
| 2021/0398245 A1* | 12/2021 | Lee ........................ H04N 19/85 |
| 2022/0139073 A1* | 5/2022 | Kim ....................... G06V 10/82 |
| | | 382/155 |

\* cited by examiner

APPARATUS AND METHOD FOR 360-DEGREE VIDEO STITCHING

CROSS REFERENCE TO RELATED APPLICATIONS

This application claims the benefit of Korean Patent Application Nos. 10-2021-0003576, filed Jan. 11, 2021, 10-2021-0006924, filed Jan. 18, 2021, and 10-2022-0000265, filed Jan. 3, 2022, which are hereby incorporated by reference in their entireties into this application.

BACKGROUND OF THE INVENTION

1. Technical Field

The following embodiments relate generally to technology for creating a 360-degree panoramic image (video) by joining multiple images.

2. Description of the Related Art

Generally, a video-stitching function requires the intrinsic and extrinsic characteristics of capture devices such as cameras for capturing respective multiple input images in order to estimate the geometrical relationships between the capture devices. However, some gaps are inevitable, because multiple input images might have some inconsistencies that cannot be calculated based on intrinsic and extrinsic matrixes. Therefore, feature extraction and matching technologies are applied to most video-stitching functions in order to help improve accuracy of stitching quality.

Further, in most video-stitching algorithms, homography is calculated based on matching feature points randomly selected from a set of matching feature points, after which it is determined whether most of the feature points satisfy a desired homography transformation model. However, when matching feature points are randomly selected in this way, the selected feature points may appear at locally concentrated positions, so the calculated homography may not be global. Therefore, in this case, the matching feature points need to be reselected in order to update the homography transformation model so that the homography transformation model is more global. Therefore, in order to correct the above-described stitching errors, there is a need to define feature parameters as information required for post-processing, such as reselection of feature correspondences or adjustment of seam information caused by updating.

Meanwhile, in the current 360-degree stitching function, output coverage parameters are specified by parameters defined in OMAF ("ISO/IEC 23090-2:2019 Information technology—Coded representation of immersive media—Part 2: Omnidirectional media format", January 2019.). However, OMAF deals with various projection formats such as equirectangular and cubemap projection, whereas the current 360-degree stitching function does not provide parameters for various projection formats.

SUMMARY OF THE INVENTION

An embodiment is intended to provide an apparatus and method for 360-degree video stitching, which define feature parameters as information for post-processing of stitching results for correcting errors in 360-degree video stitching and perform 360-degree video stitching based on the defined feature parameters.

An embodiment is intended to propose an apparatus and method for 360-degree video stitching, which define projection parameters for projecting an input stream having various projection formats and perform 360-degree video stitching based on the defined projection parameters.

In accordance with an aspect, there is provided an apparatus for 360-degree video stitching, including memory for storing at least one program, and a processor for executing the program, wherein the program is configured to stitch features of multiple input images based on at least one parameter included in a 360-degree stitching function description template, and then creating a single 360-degree video, wherein the 360-degree stitching function description template includes a configuration parameter that is an array of function parameters, the configuration parameter includes a stitching parameter, a camera parameter, a feature parameter, and a projection parameter, the feature parameter includes a method for extracting respective features from multiple input images, and the projection parameter includes a projection type that is a kind of a projection plane onto which the multiple input images are projected.

The program may be configured to detect keypoints from respective multiple input images using any one of one or more feature extraction methods and to extract descriptors for respective keypoints, and the feature extraction method may include at least one of feature detection methods using a Scale Invariant Feature Transform (SIFT), Speeded-Up Robust Features (SURF), a nonlinear diffusion filter, an accelerated KAZE algorithm, Oriented Features from Accelerated Segment Test (FAST) and Rotated Binary Robust Independent Elementary Feature (BRIEF) (ORB) based on fusion of an oriented FAST keypoint detector and a BRIEF descriptor, a Binary Robust Invariant Scalable Keypoints (BRISK) algorithm using scale space keypoint detection and a rotation-invariant keypoint descriptor, a feature descriptor using a BRIEF descriptor for matching points, and a feature detector using a Laplacian of Gaussian (LoG) filter of an image.

The feature extraction method may be a Uniform Resource Identifier (URI)-type method, wherein a Uniform Resource Name (URN) indicates the feature extraction method.

The feature parameter may further include a number of feature points, positions of feature points, and feature correspondence.

The program may be configured to perform decoding the multiple input images, extracting respective feature points of the decoded multiple input images, extracting a camera parameter based on the feature points, creating 360-degree images by projecting the decoded multiple input images onto a projection target based on the camera parameter, determining pieces of seam information of the 360-degree images based on the camera parameter, post-processing the 360-degree images based on the seam information, and encoding the post-processed 360-degree images, wherein extracting the respective feature points may include extracting the feature points based on the feature extraction method included in the feature parameter, and post-processing may be performed using the number of feature points, the positions of feature points, and the feature correspondence, which are included in the feature parameter.

The projection type may include a table-type omnidirectional projection format list including an equirectangular format and a cubemap format, and may be configured such that, when a value of Id in the table is '0', the omnidirectional projection is an equirectangular projection, when a value of Id in the table is '1', the omnidirectional projection is a cubemap projection, and when a value of Id in the table is '2', the omnidirectional projection has an additional projection format.

The program may be configured to perform decoding the multiple input images, extracting respective feature points of the decoded multiple input images, extracting a camera parameter based on the feature points, creating 360-degree images by projecting the decoded multiple input images onto a projection target based on the camera parameter, determining pieces of seam information of the 360-degree images based on the camera parameter, post-processing the 360-degree images based on the seam information, and encoding the post-processed 360-degree images, wherein creating the 360-degree images may be performed based on a projection format included in the projection parameter.

In accordance with another aspect, there is provided a method for 360-degree video stitching, including an operation of decoding multiple input images, an operation of extracting respective feature points of the decoded multiple input images, an operation of extracting a camera parameter based on the feature points, an operation of creating 360-degree images by projecting the decoded multiple input images onto a projection target based on the camera parameter, an operation of determining pieces of seam information of the 360-degree images based on the camera parameter, an operation of post-processing the 360-degree images based on the seam information, and an operation of encoding the post-processed 360-degree images, wherein the operations are performed based on a 360-degree stitching function description template, the 360-degree stitching function description template includes a configuration parameter that is an array of function parameters, the configuration parameter includes a stitching parameter, a camera parameter, a feature parameter, and a projection parameter, the feature parameter includes a method for extracting respective features from multiple input images, and the projection parameter includes a projection type that is a kind of a projection plane onto which the multiple input images are projected.

The operation of extracting the respective feature points may include detecting keypoints from respective multiple input images using any one of one or more feature extraction methods included in the feature parameter and extracting descriptors for respective keypoints, and the feature extraction method may include at least one of feature detection methods using a Scale Invariant Feature Transform (SIFT), Speeded-Up Robust Features (SURF), a nonlinear diffusion filter, an accelerated KAZE algorithm, Oriented Features from Accelerated Segment Test (FAST) and Rotated Binary Robust Independent Elementary Feature (BRIEF) (ORB) based on fusion of an oriented FAST keypoint detector and a BRIEF descriptor, a Binary Robust Invariant Scalable Keypoints (BRISK) algorithm using scale space keypoint detection and a rotation-invariant keypoint descriptor, a feature descriptor using a BRIEF descriptor for matching points, and a feature detector using a Laplacian of Gaussian (LoG) filter of an image.

The feature extraction method may be a Uniform Resource Identifier (URI)-type method, wherein a Uniform Resource Name (URN) indicates the feature extraction method.

The feature parameter may further include a number of feature points, positions of feature points, and feature correspondence.

The operation of the post-processing may be performed using the number of feature points, the positions of feature points, and the feature correspondence, which are included in the feature parameter.

The projection type may include a table-type omnidirectional projection format list including an equirectangular format and a cubemap format, and may be configured such that, when a value of Id in the table is '0', the omnidirectional projection is an equirectangular projection, when a value of Id in the table is '1', the omnidirectional projection is a cubemap projection, and when a value of Id in the table is '2', the omnidirectional projection has an additional projection format, and the operation of creating the 360-degree images may be performed based on a projection format included in the projection parameter.

In accordance with a further aspect, there is provided a method for creating a 360-degree video stitching workflow, including acquiring a request for 360-degree video stitching and 360-degree video parameters required for creation of a 360-degree video stitching workflow, acquiring a list of functions applicable to the 360-degree video stitching workflow, creating the 360-degree video stitching workflow based on functions selected from the function list, determining a number of multimedia processing entities required to process tasks constituting the 360-degree video stitching workflow and creating multiple multimedia processing entities depending on the determined number of multimedia processing entities, and allocating the tasks constituting the 360-degree video stitching workflow to the multiple multimedia processing entities, wherein the tasks constituting the 360-degree video stitching workflow are performed based on at least one parameter included in a 360-degree stitching function description template, the 360-degree stitching function description template includes a configuration parameter that is an array of function parameters, the configuration parameter includes a stitching parameter, a camera parameter, a feature parameter, and a projection parameter, the feature parameter includes a method for extracting respective features from multiple input images, and the projection parameter includes a projection type that is a kind of a projection plane onto which the multiple input images are projected.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
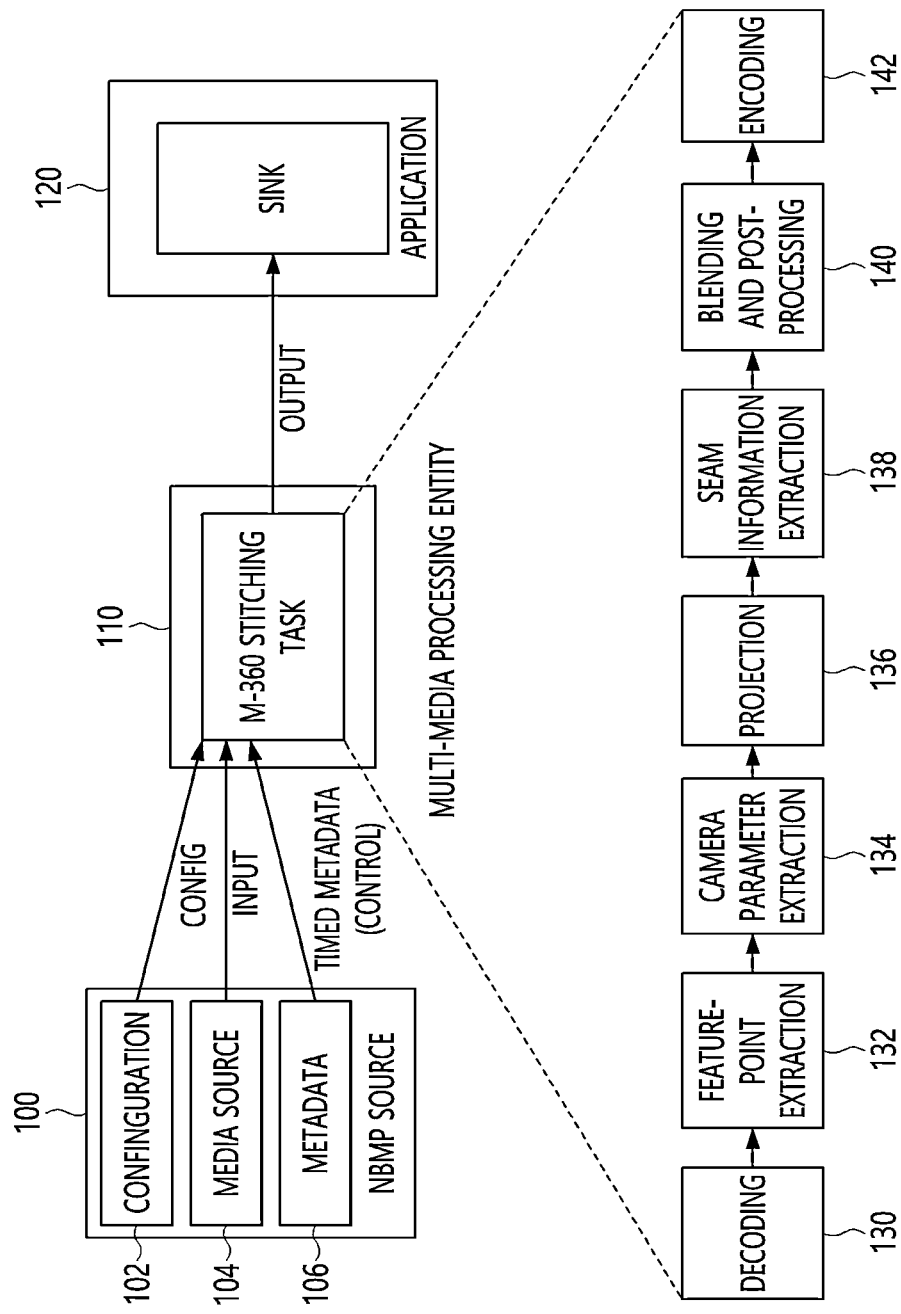
FIG. 1 is a schematic block configuration diagram illustrating an apparatus for 360-degree video stitching according to an embodiment.

Advantages and features of the present invention and methods for achieving the same will be clarified with reference to embodiments described later in detail together with the accompanying drawings. However, the present invention is capable of being implemented in various forms, and is not limited to the embodiments described later, and these embodiments are provided so that this invention will be thorough and complete and will fully convey the scope of the present invention to those skilled in the art. The present invention should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present invention.

The terms used in the present specification are merely used to describe embodiments, and are not intended to limit the present invention. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present invention pertains. Further, terms defined in generally used dictionaries are not to be interpreted as having ideal or excessively formal meanings unless they are definitely defined in the present specification.

Hereinafter, an apparatus and method for 360-degree video stitching according to embodiments will be described in detail with reference to FIGS. 1 to 4.

FIG. 1 is a schematic block configuration diagram illustrating an apparatus for 360-degree video stitching (hereinafter also referred to as a "360-degree video stitching apparatus") according to an embodiment.

Referring to FIG. 1, a multimedia-processing entity 110, corresponding to the 360-degree video stitching apparatus according to the embodiment, may provide a 360-degree stitched video, which is the result of performing a 360-degree stitching task on multiple images transmitted from a Network-Based Media Processing (NBMP) source (hereinafter referred to as a 'media processing source') 100, based on parameters received together with the images, to an application 120 for processing a 360-degree video.

First, the media processing source 100 may include configuration information 102, a media source 104, and metadata 106.

The configuration information 102 and the metadata 106 indicate information related to multiple input video streams.

The media source 104 includes raw images, which are contents of the 360-degree video. Here, the media source 104 may include both texture images and depth images, or may include only texture images.

The multimedia-processing entity 110 may be set by the workflow manager 204 of FIG. 3, which will be described later. Here, if it is determined that a video-stitching workflow cannot be processed by a single processing entity, two or more multimedia-processing entities 110 may be set. If it is determined that a video-stitching workflow can be processed by a single processing entity, only one multimedia-processing entity 110 may be set. The multimedia-processing entity 110 may be created in the cloud platform 208 of FIG. 3 by the workflow manager 204 of FIG. 3.

When two or more multimedia-processing entities 110 are set, tasks corresponding to steps 130 to 142 of FIG. 1 may be allocated to the multiple multimedia-processing entities 110. Therefore, video-stitching tasks requiring a greater amount of computing resources may be processed by the multiple multimedia-processing entities 110 at high speed.

When the video-stitching tasks are processed by the multiple multimedia-processing entities 110, configuration information of detailed tasks related to video stitching, such as image decoding, feature point extraction, camera parameter extraction, image projection, seam information extraction, blending, post-processing, and image encoding, input and output descriptors, and metadata are required in order to allocate the tasks. The information is used to process interfaces between various tasks in multiple processing entities.

In accordance with an embodiment, pieces of detailed information and parameters applied to respective detailed tasks in this way may be defined by a 360-degree video stitcher function description template, which will be described later. Thus, the multimedia-processing entity 110 may create a single 360-degree video by stitching the features of the multiple input images based on at least one parameter included in the 360-degree stitching function description template. A detailed description of the 360-degree stitching function description template according to the embodiment will be made later with reference to Tables 2 to 7, which will be described later.

Prior to the description thereof, detailed steps (steps 130 to 142) of a method for 360-degree video stitching will be described in detail.

At step 130, an encoded video stream is decoded. In detail, at step 130, through operations by several threads or Graphics Processing Units (GPUs), encoded raw images from the media source 104 are decoded. Also, as well as the media source 104, an encoded media data feed from cloud parameters may be used in decoding at step 130. The raw images are original images to which post-processing or the like is not applied.

At step 132, feature points are extracted from the raw images decoded at step 130.

The feature points are points which are references based on which respective images are caused to match each other when a specific object is tracked or recognized in multiple images. By analyzing the values of pixels distributed based on the feature points, similar portions in different images are detected. Therefore, at step 132, feature points in neighboring raw images are compared with each other, and thus corresponding points between the neighboring raw images may be determined. Further, based on the corresponding points, a stitching process may be performed between the neighboring raw images.

Here, at step 132, keypoints may be detected from respective multiple input images using one of the feature extraction methods included in the feature parameters (see Table 6, which will be described later) defined in an embodiment, and descriptors for the keypoints may be extracted. Here, the feature extraction may be performed using a feature extraction method including at least one of feature detection methods using a Scale Invariant Feature Transform (SIFT), Speeded-Up Robust Features (SURF), a nonlinear diffusion filter, an accelerated KAZE algorithm, Oriented Features from Accelerated Segment Test (FAST) and Rotated Binary Robust Independent Elementary Feature (BRIEF) (ORB) based on fusion of an oriented FAST keypoint detector and a BRIEF descriptor, a Binary Robust Invariant Scalable Keypoints (BRISK) algorithm using scale space keypoint detection and a rotation-invariant keypoint descriptor, a feature descriptor using a BRIEF descriptor for matching points, and a feature detector using a Laplacian of Gaussian (LoG) filter of an image.

Here, the feature parameters defined at step 132 may be continuously used at subsequent steps if necessary.

At step 134, extrinsic and intrinsic camera parameters are calculated based on the feature points and corresponding point sets. The extrinsic camera parameters include capture angles, capture locations, etc. of each camera. The intrinsic camera parameters include the focal length of each camera, principal point, a skew coefficient, etc.

In accordance with an embodiment, by analyzing the feature points and corresponding points, the difference between the capture angles and the difference between the capture locations of the two cameras used to capture two neighboring images may be calculated. Therefore, the extrinsic camera parameters may be determined based on the feature points and the corresponding points.

In accordance with an embodiment, by analyzing the feature points and corresponding points, the differences between the focal lengths, the principal points, the skew coefficients, etc. of the two cameras may be calculated. Therefore, the intrinsic camera parameters may be determined based on the feature points and the corresponding points.

Further, at step 134, an image distortion correction process based on the camera parameters may be selectively performed. In an embodiment, the image distortion correction process may be a process for correcting image distortion depending on lens properties.

At step 136, based on the camera parameters determined at step 134, the raw images decoded at step 130 are projected onto an image projection plane. In detail, the images are geometrically aligned based on the camera parameters and the image projection plane. Further, the geometrically aligned images are projected onto the image projection plane. As a result of the image projection, 360-degree images are created.

Here, step 136 may be performed based on the projection parameters defined in an embodiment (see Table 7, which will be described later). That is, the decoded raw images may be projected into one of various types of projection planes including a sphere, a cube, a polyhedron, and an EquiRectangular Projection (ERP).

By means thereof, various types of input streams may be covered. That is, the range of output images of the stitching parameters (output-coverage) of Table 3, which will be described later, is defined as "Coverage of the output image may be specified by following parameters defined in OMAF 7.3.5, in the following order: [coverage_shape_type, centre_azimuth, centre_elevation, centre_tilt, azimuth_range, elevation_range]". That is, the output coverage is specified by parameters defined in OMAF ("ISO/IEC 23090-2:2019 Information technology—Coded representation of immersive media—Part 2: Omnidirectional media format", January 2019.) which deals with various projection formats such as equirectangular and cubemap projections. By means of protection parameters according to an embodiment, even the 360-degree stitching function may provide parameters for various projection formats, thus covering various types of input streams dealt with in OMAF.

At step 138, the seams of neighboring images are extracted based on stitching parameters initially extracted from the 360-degree images created at step 136. Here, the stitching parameters may include seam position parameters indicating the positions of seams, or seam mask parameters indicating areas corresponding to seams in the images. The stitching parameters for seams may be determined based on the camera parameters determined at step 134.

At step 138, the stitching parameters may be updated when an object that is not present at a previous time point suddenly appears in an overlapping region between neighboring images. Therefore, depending on a change in the overlapping region, the seam position parameters or the seam mask parameters may be changed.

At step 140, blending, color correction, and noise filtering processes may be performed on the overlapping regions of the 360-degree images, created at step 136. The blending, color correction, and noise filtering processes may be performed based on the seam information extracted at step 138.

The blending process may be a process for processing images so that the 360-degree images are visually perceived as a single continuous video by blending two partial images corresponding to the overlapping regions of the 360-degree images. The color correction process may be a process for adjusting color parameters such as color, brightness, and saturation so that respective images constituting the 360-degree video are perceived as a single video. The noise-filtering process may be a process for removing noise from images. Based on the process at step 140, the 360-degree images created from the multiple images may be visually perceived as a single video.

Figure 2:
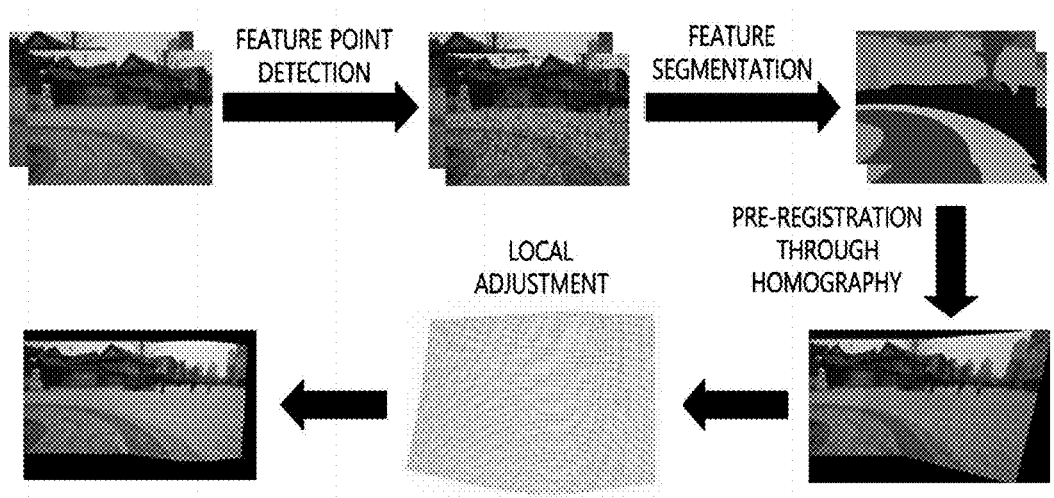
FIG. 2 is a diagram illustrating an image correction process according to an embodiment.

FIG. 2 is a diagram illustrating an image correction process according to an embodiment.

Referring to FIG. 2, in most video-stitching algorithms, homography is calculated using matching feature points randomly selected from sets of matching feature points, after which it is determined whether most feature points satisfy a homography transformation model. However, when the matching feature points are randomly selected in this way, the selected feature points appear at locally concentrated locations, and thus the calculated homography may not be global. Therefore, in this case, matching feature points may be reselected in order to update the homography transformation model so that the homography transformation model is more global. Therefore, in order to correct the above-described stitching errors, there is a need to define feature parameters as information required for post-processing, such as reselection of feature correspondences or adjustment of seam information caused by updating.

Accordingly, in an embodiment, the feature parameters may be defined as function parameters for configuration parameters, and at step 140, the corresponding process may be performed based on the feature parameters defined in an embodiment.

Here, the feature parameters may further include the number of feature points (i.e., feature point number), the positions of the feature points (i.e., feature point positions), and correspondence between the feature points (i.e., feature point correspondence or feature correspondence).

At step 142, the 360-degree images processed at step 140 are encoded. The encoding at step 142 may be performed based on cloud parameters. Further, the encoded 360-degree images may be output as a 360-degree video by a cloud platform.

Through steps 130 to 142, a video stream composed of encoded 360-degree images is created from a video stream composed of encoded two-dimensional (2D) images.

In an embodiment, the order of steps 130 to 142 may be partially changed, and some steps may be skipped. Also, an image-processing technique, which is typical in image-processing fields, may be applied to intermediate steps between steps 130 to 142. Commands corresponding to steps 130 to 142 may be executed by the cloud platform 208 of FIG. 3.

Hereinafter, descriptions, input, and output of respective tasks at steps 130 to 142 are explained in the following Table 1.

The workflow manager 204 may create a workflow for video stitching. Also, the workflow manager 204 may create multiple multimedia-processing entities for performing mul-

TABLE 1

| Task | Description | Input | Output |
| --- | --- | --- | --- |
| Decoding (130) | Involves video type conversion from encoded video stream feed from media source to raw video stream using several threads or GPUs. | Encoded media data feed from media source, and media and cloud parameters | Decoded media data such as raw images |
| Feature point extraction (132) | Involves feature-point extraction and corresponding-point-matching processes between neighboring raw images. | Raw images to be aligned(stitched), and feature extraction method | Extracted feature points and correspondence sets |
| Camera parameter extraction (134) | Involves extrinsic and intrinsic camera parameter calculation using feature points and correspondence sets. Optionally, involves image distortion correction process using camera parameters. | Extracted feature points and correspondence sets | Extrinsic/intrinsic camera parameters and images corrected for lens distortion |
| Projection (136) | Involves image projection on a sphere, cube, polyhedron, and ERP with geometric alignment based on the camera parameters. | Images corrected for lens distortion, and projection and camera parameters | Projected 360-degree images |
| Seam information extraction (138) | Involves seam extraction or update process required when object suddenly appears in overlapping region. | Projected 360-degree images and initially extracted stitching parameters including seam position or seam mask | Extracted or updated stitching parameters including seam position or seam mask |
| Blending and post-processing (140) | Involves blending, color correction, and noise filtering in overlapping region of projected 360-degree images. | Projected 360-degree images and stitching parameters | Blended and post-processed 360-degree images |
| Encoding (142) | Involves video encoding of blended and post-processed 360-degree images using multiple threads or GPUs. | Blended and post-processed 360-degree images and media and cloud parameters | Encoded 360-degree video. This could be output of cloud platform. |

The media service provider may provide a 360-degree video stitching service to the user by utilizing the workflow corresponding to the above-described steps 130 to 142.

The task directory of the media service provider may include details of the respective tasks in Table 1. Further, the workflow manager 204 of FIG. 3 may select respective tasks in Table 1 and may then prepare the workflow, described above with reference to FIG. 1.

Hereinafter, a workflow for performing video-stitching tasks in a media system for distributing the video stitching process based on steps 130 to 142 described above in FIG. 1 to multiple multimedia-processing entities 110 will be described.

Figure 3:
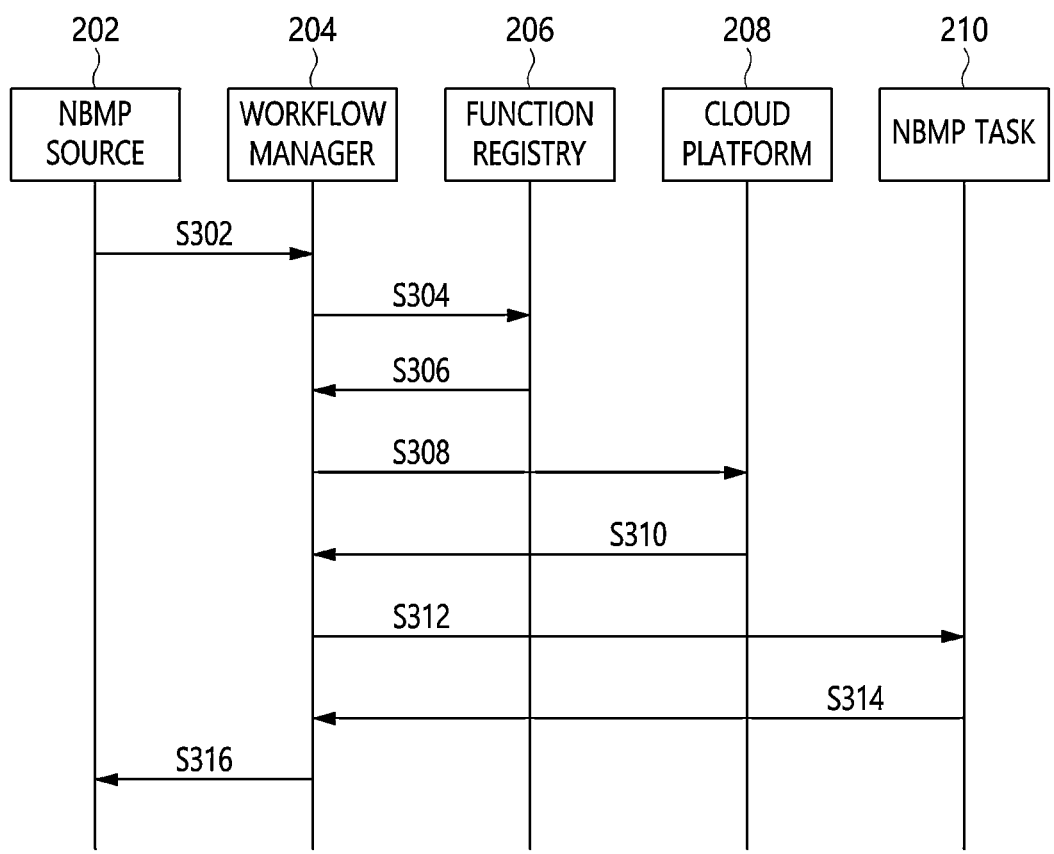
FIG. 3 is a diagram illustrating in detail a method for configuring a workflow for performing tasks in 360-degree video stitching according to an embodiment.

FIG. 3 illustrates in detail a method for configuring a workflow for performing tasks in 360-degree video stitching according to an embodiment.

The method of FIG. 3 is performed through interworking between some components of a media system for video stitching depending on multiple multimedia processing entities according to an embodiment, and some components include a media source (NBMP Source) 202, a workflow manager 204, a function registry 206, a cloud platform 208, and a media task manager (NBMP Task) 210.

Here, the media source 202, the workflow manager 204, the function registry 206, and the media task manager 210 may be operated by different respective processors. Alternatively, all or some of the workflow manager 204, the media source 202, the function registry 206, and the media task manager 210 may be operated by one processor. Further, each of the workflow manager 204, the media source 202, the function registry 206, and the media task manager 210 may include a memory device for storing information for video stitching.

tiple tasks, included in the workflow, in the cloud platform 208.

The cloud platform 208 includes multiple processors. Also, the tasks required for video stitching may be performed by the multiple multimedia-processing entities set in the cloud platform 208.

Below, the workflow configuration method for video stitching performed by the workflow manager 204 will be described in detail.

Referring to FIG. 3, at step S302, the media source 202 creates a workflow for video stitching together with a video-stitching request using a CreateWorkflow Application Programming Interface (API). The CreateWorkflow API is a dedicated API for creating a workflow. Also, the media source 202 may create a workflow description document for describing the created workflow and transmit the workflow description document to the workflow manager 204.

The workflow manager 204 creates the workflow based on the received workflow description document.

At step S304, the workflow manager 204 transmits a query or a query set to the function registry 206 so as to search for functions to be deployed in the workflow for video stitching. The query or query set describes the functions of the workflow required by the workflow description document created at step S302. Also, the function registry 206 stores a list of functions supported by the media system.

At step S306, for each query, the function registry 206 provides functions that are usable for video stitching, descriptions thereof, and a list of configuration information to the workflow manager 204. The function registry 206 compares the description of the list of functions supported by the media system with the description of the functions of the workflow described in the query or query set.

Further, the function registry 206 may provide a list of functions applicable to the workflow, among the functions supported by the media system, to the workflow manager 204.

At step S308, the workflow manager 204 selects the functions required for the workflow from the list of functions provided from the function registry 206 at step S306. Further, the workflow manager 204 may access the cloud platform 208 to create one or more multimedia-processing entities in the cloud platform 208 in accordance with the requirements of the selected functions.

At step S310, the cloud platform 208 confirms the creation of the one or more multimedia-processing entities. Further, the cloud platform 208 may confirm the creation of network access information related to the one or more multimedia-processing entities. The cloud platform 208 transfers information indicating that the one or more multimedia-processing entities are created to the workflow manager 204.

At step S312, the workflow manager 204 creates information about the configuration of each task. Further, the workflow manager 204 transmits the configuration information of each task to the task manager 210. In order to transmit the configuration information to the task manager 210, a task API may be used. The task API may be a dedicated API for creating the configuration information.

At step S314, the task manager 210 determines whether configuration of each task has been successfully performed. If it is determined that configuration of the current task has been successfully performed, the task manager 210 generates access information to allow the workflow manager 204 to access the next task. Further, the task manager 210 generates access information for the workflow manager 204. Steps 312 and 314 are performed for each task, and thus whether successful configuration of the entire workflow has been performed may be determined.

At step S316, the workflow manager 204 confirms the creation of the workflow, and notifies the media source 202 that media processing for video stitching can start. Further, the media source 104 provided by the media source 202 may be processed based on the workflow, and thus a 360-degree video can be created.

As described above, the functions to be used in the workflow may be configured, a suitable number of multimedia-processing entities for performing the tasks in the workflow may be created, and a large number of parameters for respective tasks in the workflow may be required in order to determine the configuration information of respective workflow tasks.

Table 2 below shows an example of a parameter list in a 360-degree stitching function description template.

TABLE 2

| Descriptor | Parameter Name | Type | Description |
| --- | --- | --- | --- |
| General | Description | string | stitches multiple input frames into 360-degree equirectangular projected output. |
|  | nbmp-brand | String | "urn:mpeg:mpegi:nbmp:2020:360-degree stitcher" |
|  | input-ports | Array of objects | Multiple input ports shall be defined for input media (e.g. images or videos). Specific media types supported by the implementation shall be defined by Input Descriptor (e.g. mime-type and the corresponding media type parameters). |
|  | output-ports | Array of objects | One output port shall be defined for monoscopic output (image or video). Any other optional outputs for other output types shall be defined if supported. Specific media types supported by the implementation shall be defined by Output Descriptor (e.g. mime-type and the corresponding media type parameters). The output media type shall be the same as the input media type. |
| Processing | Keywords | Array of strings | [<br>"360-degree panoramic stitcher",<br>"360-degree stitcher"<br>] |
| Configuration | Parameters | Array of parameters | Function parameters:<br>stitching parameters<br>camera parameters<br>feature parameters<br>projection parameters |

Referring to Table 2, the 360-degree stitching function description template according to an embodiment may include a general descriptor, a processing descriptor, and a configuration descriptor.

The configuration descriptor indicates sub-parameters for the configuration information of respective tasks required for a video-stitching workflow, and includes various function parameters.

For example, stitching parameters may be represented by array-format data including sub-parameters related to seam positions, seam masks, etc.

Also, the camera parameters may be represented by array-format data including sub-parameters related to the focal length of each camera, the principal point, the skew coefficient, and the translation and rotation of each camera.

Further, the feature parameters proposed according to an embodiment may be represented by array-format data, including sub-parameters related to a feature extraction method, a feature point number, feature point positions, and feature correspondence.

Furthermore, the projection parameters proposed according to an embodiment may be represented by array-format data, including sub-parameters related to a projection type or the like.

Below, examples of parameters required for respective tasks in video stitching are described in the following Tables 3 to 7.

Table 3 shows examples of stitching parameters.

TABLE 3

| Name | Definition | Unit | Type | Valid Range |
|---|---|---|---|---|
| stitching-type | Output panoramic type, one of "monoscopic" and "stereoscopic". The default value is "monoscopic". | N/A | String | N/A |
| camera-parameters | Camera and capture-related parameters | N/A | Array of camera objects | N/A |
| v-seam-positions | Interpolated vertical areas where overlapping fields of view occur between neighboring frames. The number of positions is the same as the number of overlapping portions. Each position can be represented by a pair of position numbers in degrees (starting and ending degrees), and the total size of the array equals the number of seams multiplied by 2. | degree | Array of numbers | N/A |
| h-seam-positions | Interpolated horizontal areas where overlapping fields of view occur between neighboring frames. The number of positions is the same as the number of overlapping portions. Each position can be represented by a pair of position numbers in degrees (starting and ending degrees), and the total size of the array equals the number of seams multiplied by 2. | degree | Array of numbers | N/A |
| seam-mask | Interpolated area locations may be represented by a mask image, which has a value of only 1 or 0. This parameter is optional. | URL | String | N/A |
| stitching-method | A specific stitching algorithm may be specified for fast or fine stitching approaches. The value can be one of "fast", "normal", and "fine". The default value is "fast". | N/A | String | N/A |
| seam-extent-freedom | The seam margin may be expanded in degree. The size of the array must be half of the seam position. The default value for each seam is 0 (zero). | pixel | Array of numbers | N/A |
| convergence-distance | Convergence distance selection criteria may be specified. This determines the handling of near and far detail reproduction around seam positions. The value is one of "auto", "near", "far". The default value is "auto". | N/A | String | N/A |
| camera-weighting | The weighting value of the input to a stitching process. The higher the weighting value is, the more important the input is. The value shall be normalized to a scale from 0 to 100. The output quality changes when the value is changed. The value for each input shall be ordered the same as the order of the input ports, and the size of the array is equal to the number of input media streams. | N/A | Array of numbers | 0 . . . 100 |
| output-coverage | Coverage of the output image may be specified by the following parameters, defined in OMAF 7.3.5, in the following order: [coverage_shape_type, centre_azimuth, centre_elevation, centre_tilt, azimuth_range, elevation_range] | degree | Array of numbers | −360 . . . 360 |

Table 4 shows examples of camera parameters, specifically camera object parameters.

TABLE 4

| Name | Definition | Unit | Type | Valid Range |
|---|---|---|---|---|
| camera-intrinsic | Intrinsic camera lens parameters representing the optical center and focal length of the camera, as well as the skew coefficient | N/A | Object | N/A |
| camera-extrinsic | Camera transformation parameters representing a rigid transformation from a 3-D world coordinate system to the camera's 3-D coordinate system. The structure is a 4 × 4 homogeneous transformation matrix in an array form, and is in row major order. | N/A | Array of numbers | N/A |
| camera-shutter-type | Camera shutter type, one of "rolling" and "global". The default value is "rolling". | N/A | String | N/A |
| camera-sync-skew | Camera shutter synchronization skew value with respect to the first camera when multiple cameras are used. The default value is 0. | Millisecond | Number | N/A |

TABLE 4-continued

| Name | Definition | Unit | Type | Valid Range |
|---|---|---|---|---|
| capture-environment | Captured scene type, one of "indoor", "outdoor", and "unknown/unspecified". The default is "unknown". | N/A | String | N/A |
| shooting-type | Capture shooting type, one of "long shoot", "medium shoot", "close up", and "unspecified". The default is "unspecified". | N/A | String | N/A |

Table 5 shows examples of camera parameters, especially intrinsic camera object parameters.

TABLE 5

| Name | Definition | Unit | Type | Valid Range |
|---|---|---|---|---|
| camera-type | Camera type, one of "pinhole", "fisheye", and "omnidirectional". The default value is "pinhole". | N/A | String | N/A |
| focal-length | Focal length (x, y) | pixel | Array of numbers | N/A |
| principal-point | Principal point (optical center) (x, y) | pixel | Array of numbers | N/A |
| distortion | Coefficients of various radial and other distortions. The coefficient array follows the structure used by OpenCV, such as a one-dimensional vector of ($k_1$, $k_2$, $p_1$, $p_2$ [, $k_3$ [, $k_4$, $k_5$, $k_6$ [, e1, e2 [, e3 ... ]]]]), with lengths such as 4, 5, 8, 10 and higher. The "e" coefficients are parameters for Entrance Pupil (EP) distortion correction, which is defined in MPEG-I Part 7 and OMAF. | N/A | Array of numbers | N/A |

Table 6 shows examples of feature parameters.

TABLE 6

| Name | Definition | Unit | Type | Valid Range |
|---|---|---|---|---|
| feature-extraction-method | URN indicates the feature extraction method and takes one of the following values according to the feature extraction methods in OpenCV.<br>1. urn:opencv:cv:feature2d:sift<br>extracting keypoints and computing descriptors using the Scale Invariant Feature Transform (SIFT) algorithm<br>2. urn:opencv:cv:feature2d:surf<br>extracting Speeded-Up Robust Features (SURF) from an image<br>3. urn:opencv:cv:feature2d:kaze<br>keypoint detector and descriptor extractor using nonlinear diffusion filter in the scale space<br>4. urn:opencv:cv:feature2d:akaze<br>keypoint detector and descriptor extractor using accelerated KAZE algorithm<br>5. urn:opencv:cv:feature2d:orb<br>keypoint detector and descriptor extractor using ORB (Oriented FAST and Rotated BRIEF) based on the fusion of Oriented FAST keypoint detector and BRIEF descriptor<br>6. urn:opencv:cv:feature2d:brisk<br>keypoint detector and descriptor extractor using BRISK (Binary Robust Invariant Scalable Keypoints) algorithm that utilizes scale space keypoint detection and rotation invariant keypoint descriptor<br>7. urn:opencv:cv:feature2d:brief<br>feature descriptor using Binary Robust Independent Elementary Feature (BRIEF) descriptor for matching points<br>8. urn:opencv:cv:feature2d:log<br>feature detector using Laplacian of Gaussian(LoG) filter of an image | N/A | URI | N/A |

TABLE 6-continued

| Name | Definition | Unit | Type | Valid Range |
|------|------------|------|------|-------------|
|  | 9. 'other URN'<br>other URN indicating other feature extraction method<br>NOTE<br>Additional methods may become available. We need an extensive mechanism to support them. |  |  |  |

TABLE 7 illustrates examples of projection parameters.

| Name | Definition | Unit | Type | Valid Range |
|------|------------|------|------|-------------|
| projection-type | Projection type information for the following tasks, which perform any video processing with the output of this stitching function, for instance OMAF Packager.<br>Takes one of the following values according to the projection format list:<br>  'Equirectangular'<br>  'Cubemap'<br>Default is 'Equirectangular'<br>Omnidirectional projection formats<br>Id : Omnidirectional projection<br>0 : Equirectangular<br>1 : Cubemap<br>2 : Other projection formats | N/A | String | N/A |

Table 8 shows an embodiment of a JSON schema in which various function parameters, as sub-parameters for the configuration information of tasks required for video-stitching workflow included in the configuration descriptor, are defined in a JavaScript language. Such a JSON schema may be transferred to the foregoing multimedia-processing entity and used for a 360-degree video stitching task.

TABLE 8

```
{
  "parameters": [
    {
      "name": "stitching-type",
      "id": 1,
      "datatype": "string",
      "values": [
        {
          "id": 11,
          "restrictions": [
            "monoscopic"
          ]
        },
        {
          "id": 12,
          "restrictions": [
            "stereoscopic"
          ]
        }
      ]
    },
    {
      "name": "camera-parameters",
      "id": 2,
      "datatype": "array",
      "schema": {
        "type": "object",
        "properties": {
          "camera-intrinsic": {
            "type": "object",
            "$ref": "#/definitions/camera-intrinsic"
          },
          "camera-extrinsic": {
            "type": "array",
```

TABLE 8-continued

```
            "items": {
              "type": "number",
              "minItems": 16,
              "maxItems": 16
            }
          },
          "camera-shutter-type": {
            "type": "string",
            "desciption": "The camera shutter type. One of 'rolling', and 'global'. Default is 'rolling'"
          },
          "camera-sync-skew": {
            "type": "number"
          },
          "capturing-environment": {
            "type": "string"
          },
          "shooting-type": {
            "type": "string"
          }
        }
      }
    },
    {
      "name": "v-seam-positions",
      "id": 3,
      "datatype": "array",
      "schema": {
        "type": "number"
      }
    },
    {
      "name": "h-seam-positions",
      "id": 4,
      "datatype": "array",
      "schema": {
        "type": "number"
      }
    },
    {
      "name": "seam-mask",
      "id": 5,
      "datatype": "string"
    },
    {
      "name": "stitching-method",
      "id": 6,
      "datatype": "string"
    },
    {
      "name": "seam-extent-freedom",
      "id": 7,
      "datatype": "array",
      "schema": {
        "type": "number"
      }
    },
    {
      "name": "convergence-distance",
      "id": 8,
      "datatype": "string"
    },
    {
      "name": "camera-weighting",
      "id": 9,
      "datatype": "array",
```

TABLE 8-continued

```
    "schema": {
      "type": "integer"
    }
  },
  {
    "name": "output-coverage",
    "id": 10,
    "datatype": "array",
    "schema": {
      "type": "number"
    }
  },
  {
    "name": "feature-parameter",
    "id": 11,
    "datatype": "object",
    "schema": {
        "$ref": "#/definitions/feature-parameter"
    }
  },
  {
    "name": "projection-parameters",
    "id": 12,
    "datatype": "array",
    "schema": {
        "$ref": "#/definitions/projection-parameter"
    }
  }
],
"definitions": {
  "camera-intrinsic": {
    "type": "object",
    "properties": {
      "camera-type": {
        "type": "string",
        "description": "Camera type. One of 'pinhole', 'fisheye',
        'omnidirectional'. Default is 'pinhole'"
      },
      "focal-length": {
        "type": "array",
        "items": {
            "type": "number",
            "minItems": 2,
            "maxItems": 2
        }
      },
      "principal-point": {
        "type": "array",
        "items": {
            "type": "number",
            "minItems": 2,
            "maxItems":2
        }
      },
      "distortion": {
        "type": "array",
        "items": {
            "type": "number",
            "minItems": 4
        }
      }
    }
  },
  "feature-parameter": {
    "type": "object",
    "properties": {
      "feature-extraction-method": {
          "type": "string",
          "format": "uri",
          "patternProperties": {
              "^urn:": ("type": "string"}
          },
          "additionalProperties": false
      }
    }
  },
  "projection-parameter": {
    "type": "string",
    "properties": {
      "projection-type": {
```

TABLE 8-continued

```
        "type": "string",
        "description": "Projection type. One of Equirectangular,
        Cubemap, or other projection type. Default is
        Equirectangular."
      }
    }
  }
}
}
```

Figure 4:
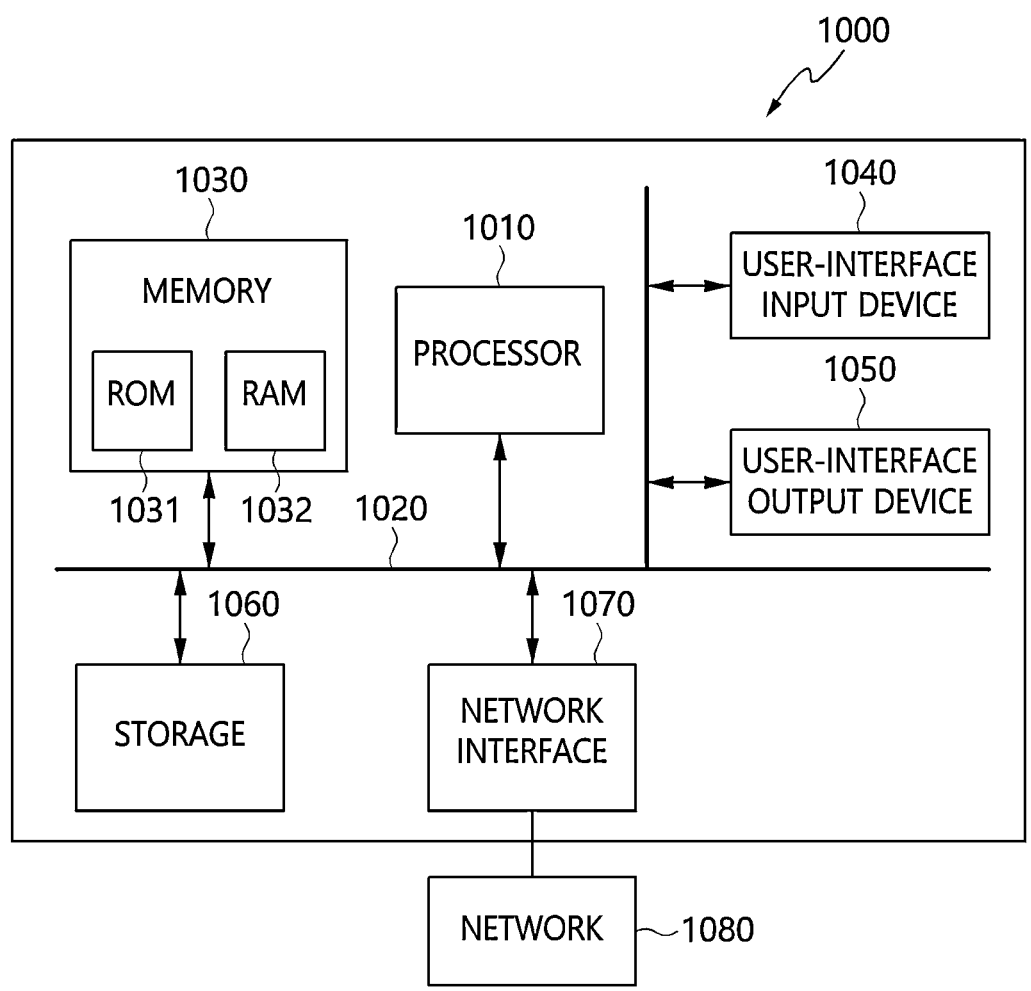
FIG. 4 is a diagram illustrating the configuration of a computer system according to an embodiment.

FIG. 4 is a diagram illustrating the configuration of a computer system according to an embodiment.

An apparatus for 360-degree video stitching according to an embodiment may be implemented in a computer system 1000, such as a computer-readable storage medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

In accordance with embodiments, 360-degree video stitching may be performed based on feature parameters defined as information for post-processing of stitching results required in order to correct errors in 360-degree video stitching, thus improving the quality of 360-degree stitched video.

Further, in accordance with embodiments, 360-degree video stitching may be performed in various types of projection formats, and thus 360-degree video stitching functions may be improved.

Although the embodiments of the present invention have been disclosed with reference to the attached drawing, those skilled in the art will appreciate that the present invention can be implemented in other concrete forms, without changing the technical spirit or essential features of the invention. Therefore, it should be understood that the foregoing embodiments are merely exemplary, rather than restrictive, in all aspects.

What is claimed is:

1. An apparatus for 360-degree video stitching, comprising:
a memory for storing at least one program; and
a processor for executing the program,
wherein the program is configured to stitch features of multiple input images based on at least one parameter included in a 360-degree stitching function description template, and then creating a single 360-degree video,
wherein the 360-degree stitching function description template includes a configuration parameter that is an array of function parameters,
wherein the configuration parameter includes a stitching parameter, a camera parameter, a feature parameter, and a projection parameter, wherein the feature parameter includes a method for extracting respective features from multiple input images, and wherein the projection parameter includes a projection type that is a kind of a projection plane onto which the multiple input images are projected, wherein the apparatus for 360-degree video stitching is included in a cloud platform, and wherein the program is configured to perform post-processing 360-degree images based on seam information using a number of feature points, positions of feature points, and feature correspondence, which are included in the feature parameter.

2. The apparatus of claim 1, wherein:

the program is configured to detect keypoints from respective multiple input images using any one of one or more feature extraction methods and to extract descriptors for respective keypoints, and the feature extraction method comprises at least one of feature detection methods using a Scale Invariant Feature Transform (SIFT), Speeded-Up Robust Features (SURF), a nonlinear diffusion filter, an accelerated KAZE algorithm, Oriented Features from Accelerated Segment Test (FAST) and Rotated Binary Robust Independent Elementary Feature (BRIEF) (ORB) based on fusion of an oriented FAST keypoint detector and a BRIEF descriptor, a Binary Robust Invariant Scalable Keypoints (BRISK) algorithm using scale space keypoint detection and a rotation-invariant keypoint descriptor, a feature descriptor using a BRIEF descriptor for matching points, and a feature detector using a Laplacian of Gaussian (LoG) filter of an image.

3. The apparatus of claim 2, wherein the feature extraction method is a Uniform Resource Identifier (URI)-type method, wherein a Uniform Resource Name (URN) indicates the feature extraction method.

4. The apparatus of claim 3, wherein the program is configured to perform:

decoding the multiple input images;

extracting respective feature points of the decoded multiple input images;

extracting a camera parameter based on the feature points;

creating 360-degree images by projecting the decoded multiple input images onto a projection target based on the camera parameter;

determining pieces of seam information of the 360-degree images based on the camera parameter;

post-processing the 360-degree images based on the seam information; and encoding the post-processed 360-degree images, wherein extracting the respective feature points comprises extracting the feature points based on the feature extraction method included in the feature parameter.

5. The apparatus of claim 1, wherein:

the projection type includes a table-type omnidirectional projection format list including an equirectangular format and a cubemap format, and is configured such that:

when a value of Id in the table is '0', the omnidirectional projection is an equirectangular projection, when a value of Id in the table is '1', the omnidirectional projection is a cubemap projection, and when a value of Id in the table is '2', the omnidirectional projection has an additional projection format.

6. The apparatus of claim 5, wherein the program is configured to perform:

decoding the multiple input images;

extracting respective feature points of the decoded multiple input images;

extracting a camera parameter based on the feature points;

creating 360-degree images by projecting the decoded multiple input images onto a projection target based on the camera parameter;

determining pieces of seam information of the 360-degree images based on the camera parameter;

post-processing the 360-degree images based on the seam information; and encoding the post-processed 360-degree images, wherein creating the 360-degree images is performed based on a projection format included in the projection parameter.

7. A method for 360-degree video stitching, comprising:

an operation of decoding multiple input images;

an operation of extracting respective feature points of the decoded multiple input images;

an operation of extracting a camera parameter based on the feature points;

an operation of creating 360-degree images by projecting the decoded multiple input images onto a projection target based on the camera parameter;

an operation of determining pieces of seam information of the 360-degree images based on the camera parameter;

an operation of post-processing the 360-degree images based on the seam information; and an operation of encoding the post-processed 360-degree images, wherein the operations are performed based on a 360-degree stitching function description template, wherein the 360-degree stitching function description template includes a configuration parameter that is an array of function parameters, wherein the configuration parameter includes a stitching parameter, a camera parameter, a feature parameter, and a projection parameter, wherein the feature parameter includes a method for extracting respective features from multiple input images, and wherein the projection parameter includes a projection type that is a kind of a projection plane onto which the multiple input images are projected, and wherein the method for 360-degree video stitching is performed in a cloud platform, and wherein the operation of the post-processing is performed using a number of feature points, positions of feature points, and feature correspondence, which are included in the feature parameter.

8. The method of claim 7, wherein:

the operation of extracting the respective feature points comprises detecting keypoints from respective multiple input images using any one of one or more feature extraction methods included in the feature parameter and extracting descriptors for respective keypoints, and the feature extraction method comprises at least one of feature detection methods using a Scale Invariant Feature Transform (SIFT), Speeded-Up Robust Features (SURF), a nonlinear diffusion filter, an accelerated KAZE algorithm, Oriented Features from Accelerated Segment Test (FAST) and Rotated Binary Robust Independent Elementary Feature (BRIEF) (ORB) based on fusion of an oriented FAST keypoint detector and a BRIEF descriptor, a Binary Robust Invariant Scalable Keypoints (BRISK) algorithm using scale space keypoint detection and a rotation-invariant keypoint descriptor, a feature descriptor using a BRIEF descriptor for matching points, and a feature detector using a Laplacian of Gaussian (LoG) filter of an image.

9. The method of claim 8, wherein the feature extraction method is a Uniform Resource Identifier (URI)-type method, wherein a Uniform Resource Name (URN) indicates the feature extraction method.

10. The method of claim 8, wherein:
the projection type includes a table-type omnidirectional projection format list including an equirectangular format and a cubemap format, and is configured such that:
when a value of Id in the table is '0', the omnidirectional projection is an equirectangular projection,
when a value of Id in the table is '1', the omnidirectional projection is a cubemap projection, and
when a value of Id in the table is '2', the omnidirectional projection has an additional projection format, and
the operation of creating the 360-degree images is performed based on a projection format included in the projection parameter.

\* \* \* \* \*